US009010794B2

(12) United States Patent
Shirk, Jr.

(10) Patent No.: US 9,010,794 B2
(45) Date of Patent: Apr. 21, 2015

(54) UNIVERSAL FIT FIFTH WHEEL TRAILER SAFETY DEVICE

(71) Applicant: Integrity Innovations Group, LLC, New Paris, IN (US)

(72) Inventor: Paul W Shirk, Jr., Goshen, IN (US)

(73) Assignee: Integrity Innovations Group, LLC, New Paris, IN (US)

( * ) Notice: Subject to any disclaimer, the term of this patent is extended or adjusted under 35 U.S.C. 154(b) by 0 days.

(21) Appl. No.: 14/245,271

(22) Filed: Apr. 4, 2014

(65) Prior Publication Data
US 2014/0300081 A1 Oct. 9, 2014

Related U.S. Application Data

(60) Provisional application No. 61/808,388, filed on Apr. 4, 2013.

(51) Int. Cl.
*B60D 1/28* (2006.01)
*B62D 53/10* (2006.01)
*B62D 53/08* (2006.01)

(52) U.S. Cl.
CPC ............... *B62D 53/10* (2013.01); *B62D 53/08* (2013.01)

(58) Field of Classification Search
CPC .................................. B60D 1/28; B60D 1/60
USPC .................................. 280/432, 433, 434, 457
See application file for complete search history.

(56) References Cited

U.S. PATENT DOCUMENTS

| | | | | | |
|---|---|---|---|---|---|
| 2,871,030 | A | * | 1/1959 | Hollis | 280/492 |
| 3,823,960 | A | * | 7/1974 | Boggs | 280/432 |
| 5,498,045 | A | * | 3/1996 | Morgan et al. | 293/122 |
| 6,491,317 | B1 | * | 12/2002 | Breese et al. | 280/432 |
| 6,695,337 | B1 | * | 2/2004 | Breese et al. | 280/433 |
| 7,100,935 | B1 | * | 9/2006 | Dunbar | 280/433 |
| 7,597,310 | B2 | * | 10/2009 | Solomon | 267/264 |
| D706,178 | S | * | 6/2014 | Shirk, Jr. | D12/162 |
| 2003/0042706 | A1 | * | 3/2003 | Breese | 280/432 |

* cited by examiner

*Primary Examiner* — Joseph Rocca
*Assistant Examiner* — Michael Stabley
(74) *Attorney, Agent, or Firm* — Botkin & Hall, LLP

(57) ABSTRACT

A trailer safety device is provided having two attachment legs that are mounted to frame rails of a towing vehicle. The attachment legs are mounted behind a hitch using U-bolts. The legs continue rearward of the vehicle and meet to form a catch. Failure of the hitch causes a trailer kingpin to become disengaged from the towing vehicle and travel rearward. Rearward travel of the trailer will cause the kingpin to become ensnared on the catch.

11 Claims, 5 Drawing Sheets

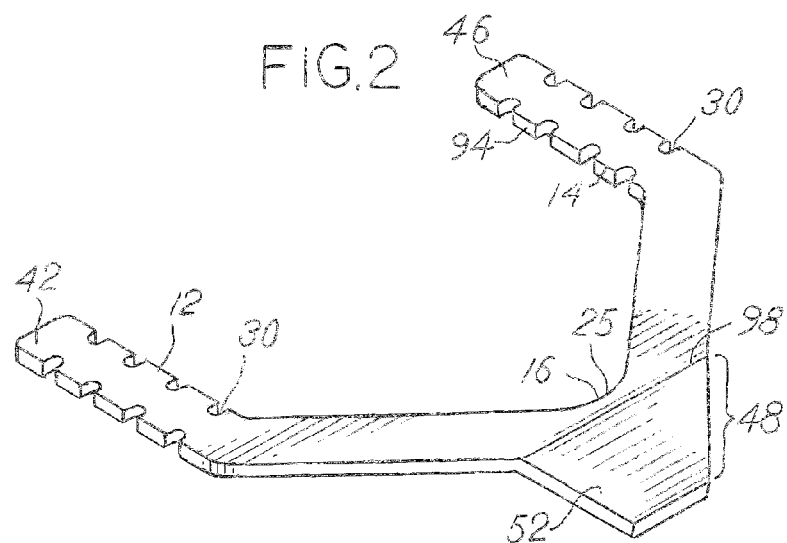
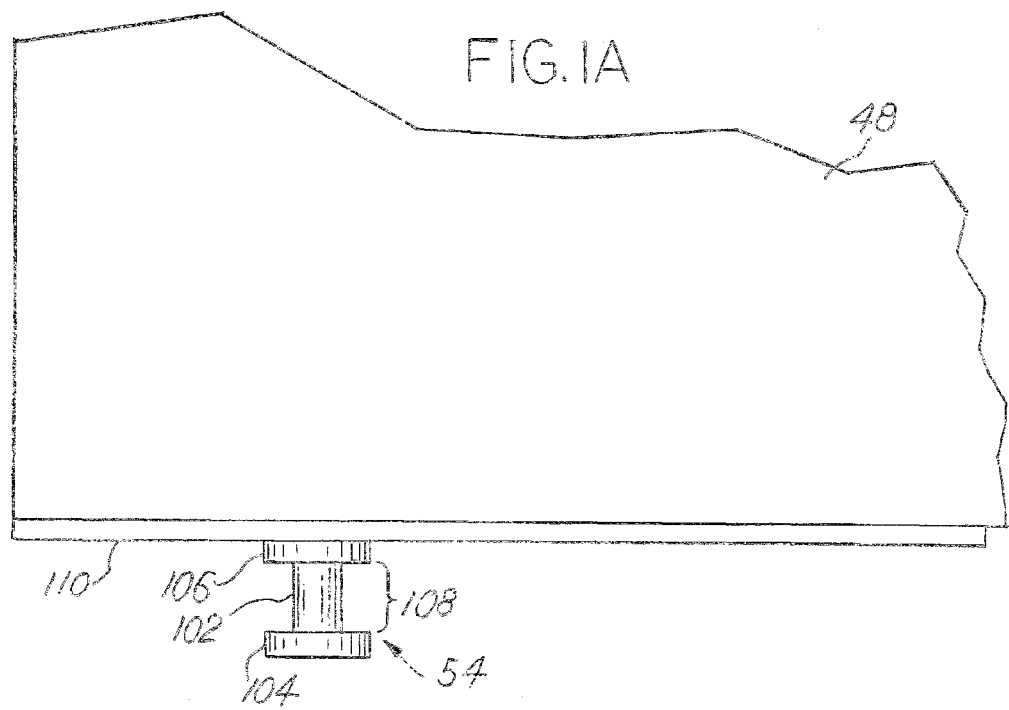

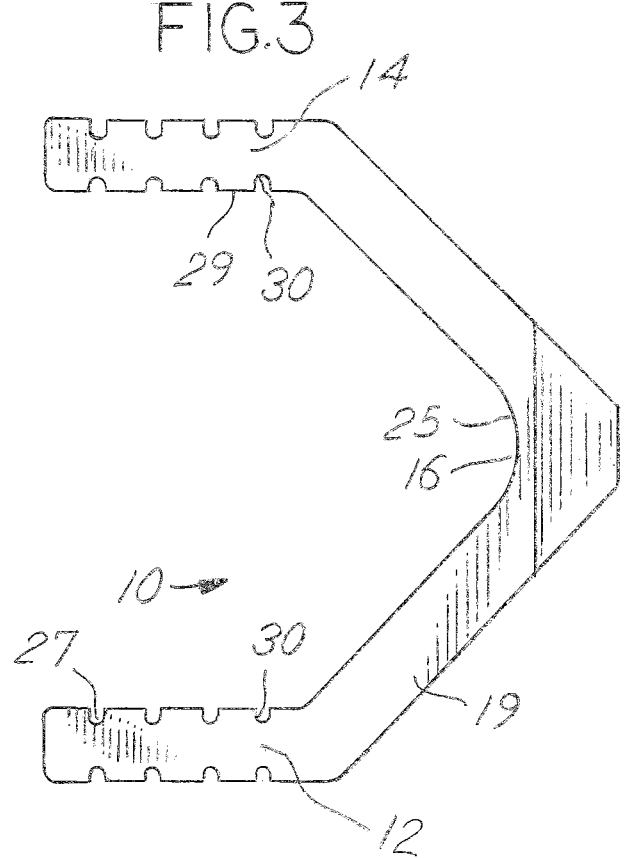
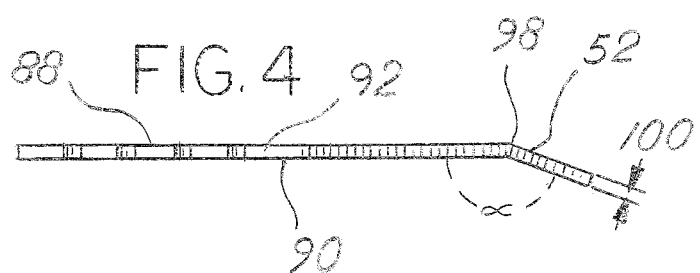

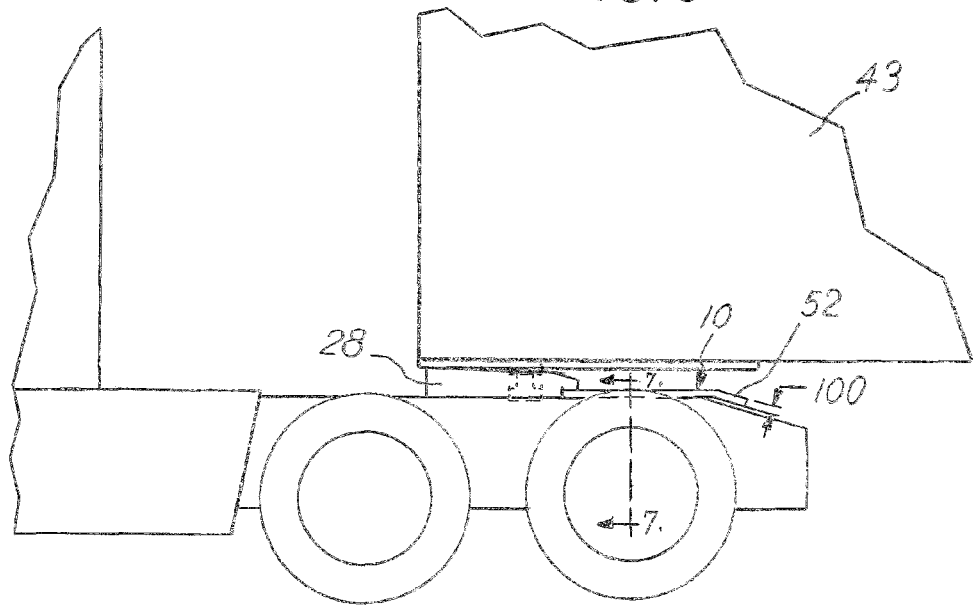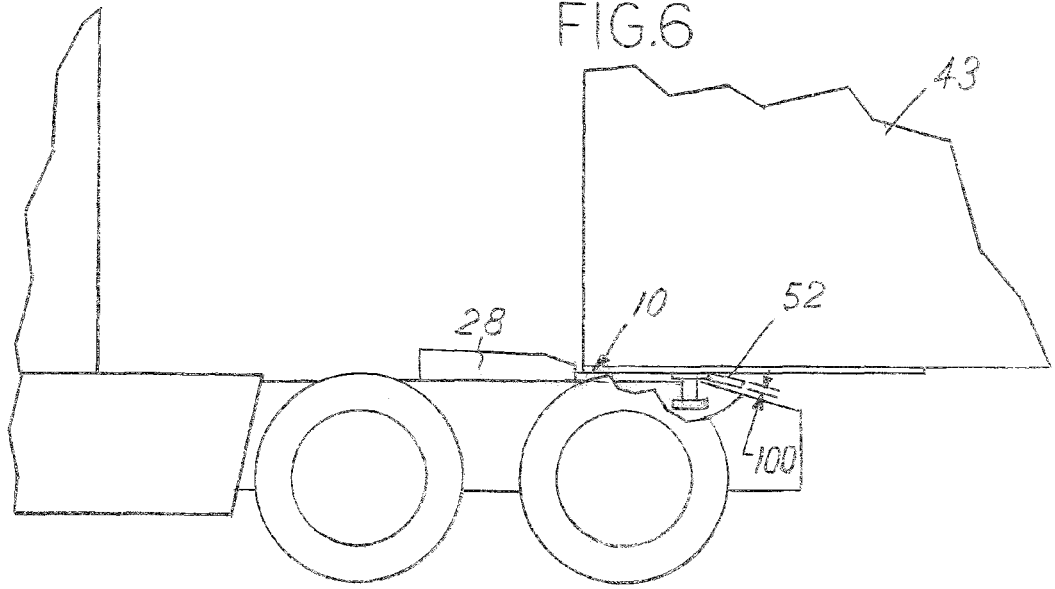

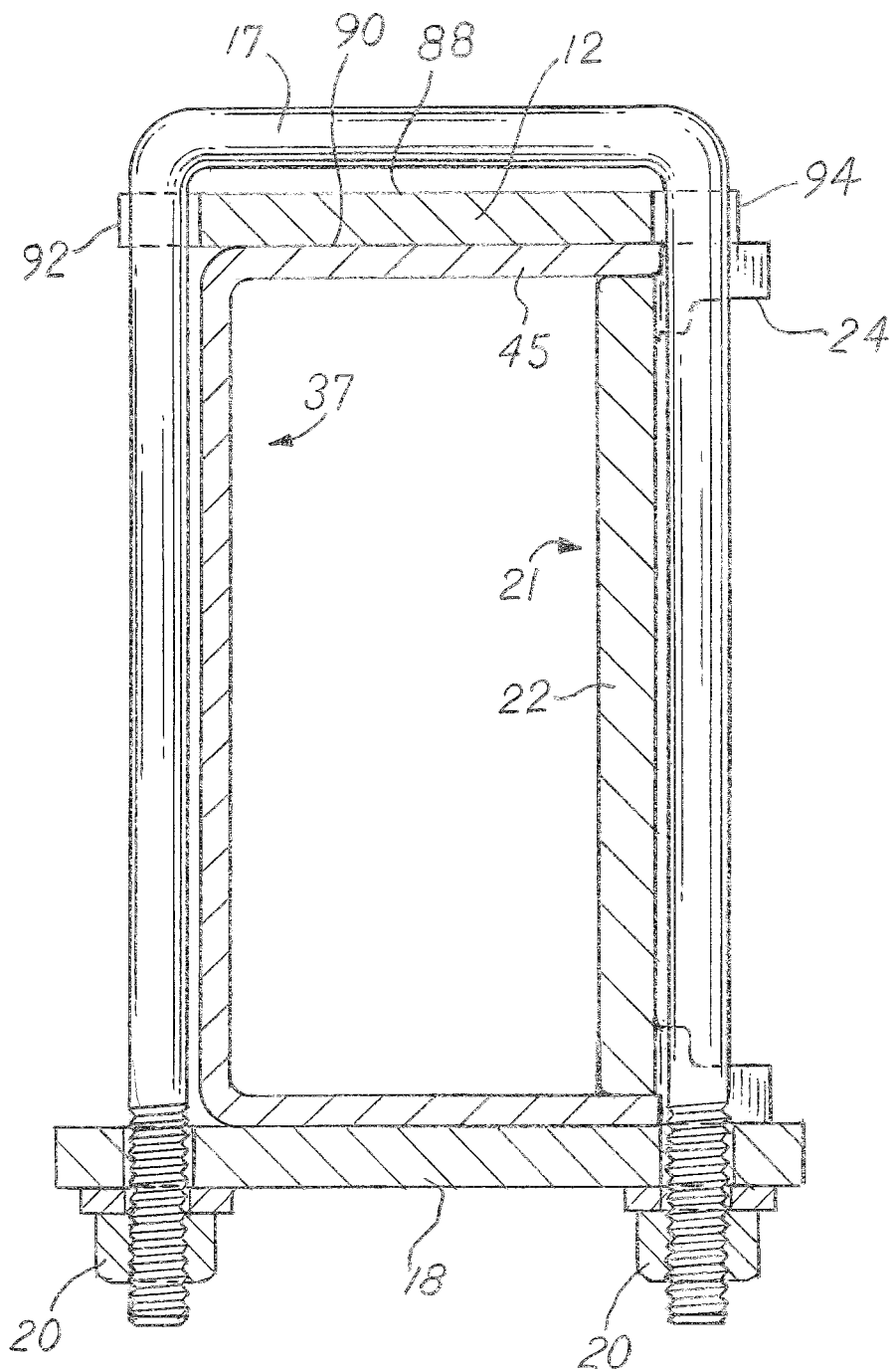

UNIVERSAL FIT FIFTH WHEEL TRAILER SAFETY DEVICE

CROSS REFERENCE TO RELATED APPLICATIONS

This application claims the benefit of U.S. Provisional Application No. 61/808,388, filed Apr. 4, 2013, the disclosures of which are hereby incorporated by reference.

BACKGROUND OF THE INVENTION

Towable trailers are frequently coupled to a vehicle by a fifth-wheel trailer hitch. Such hitches have been used for decades. In the typical case, a fifth-wheel hitch is mounted on a pair of parallel rails, with the rails in turn mounted to the frame of the vehicle. The fifth-wheel hitch is typically located above, or forward of, the vehicle's rear-most axle. A trailer used with a fifth-wheel hitch includes a kingpin downwardly extending from the front portion of the trailer. The kingpin is coupled to the fifth-wheel hitch at a keyhole slot in the hitch by an articulating jaw. The jaw extends around the kingpin so as to prevent movement of the kingpin out of the keyhole slot. The articulating jaw is composed of mechanical parts which allow it to move between a locked and an unlocked position to allow the trailer to be coupled and uncoupled from the towing vehicle. As with any mechanical part, the articulating jaw is subject to mechanical failure. A typical towing vehicle has no safety mechanism which holds the trailer to the towing vehicle in the case of an articulating jaw failure. When a vehicle and trailer are traveling, failure of the articulating jaw generally results in the trailer coming loose from the vehicle, and can result in significant injury to person and property.

SUMMARY OF THE INVENTION

The present invention relates to a safety device which serves as a safety mechanism to hold a trailer to a vehicle in the case of a fifth-wheel hitch failure. The safety device is U-shaped and includes a pair of mounting arms for securing the safety device to a vehicle. The safety device spans between, and extends rearwardly from, the mounting arms and the base of the "U" serves as a catch where the kingpin will be retained in the event the kingpin is detached from the articulating jaw of the fifth-wheel hitch while the vehicle is in motion. If the hitch fails and the kingpin disengages, the trailer is allowed to slide rearward and become completely detached. A detached trailer from a tractor is frequently a destructive event which can easily become deadly if the tractor-trailer is in motion. Due to the significant mass of a loaded trailer and the potentially deadly outcome from a detached moving trailer, it is desirable to have a backup safety device on the tractor to keep the trailer from becoming completely detached.

BRIEF DESCRIPTION OF THE DRAWINGS

A preferred embodiment of this invention has been chosen wherein:

FIG. 1A is a side cutaway view of a trailer and king pin;
FIG. 2 is a close-up perspective view of the safety device of FIG. 1;
FIG. 3 is a top view of the safety device of FIG. 2;
FIG. 4 is a side view of the safety device of FIG. 2;
FIG. 5 is a side view of the invention as it is installed on a tractor trailer;
FIG. 6 is a side view of the invention with the trailer being retained by the safety device of the present invention;
and
FIG. 7 is a partial section view 7-7 of the invention as installed on the tractor.

DESCRIPTION OF THE PREFERRED EMBODIMENT

Figure 1:
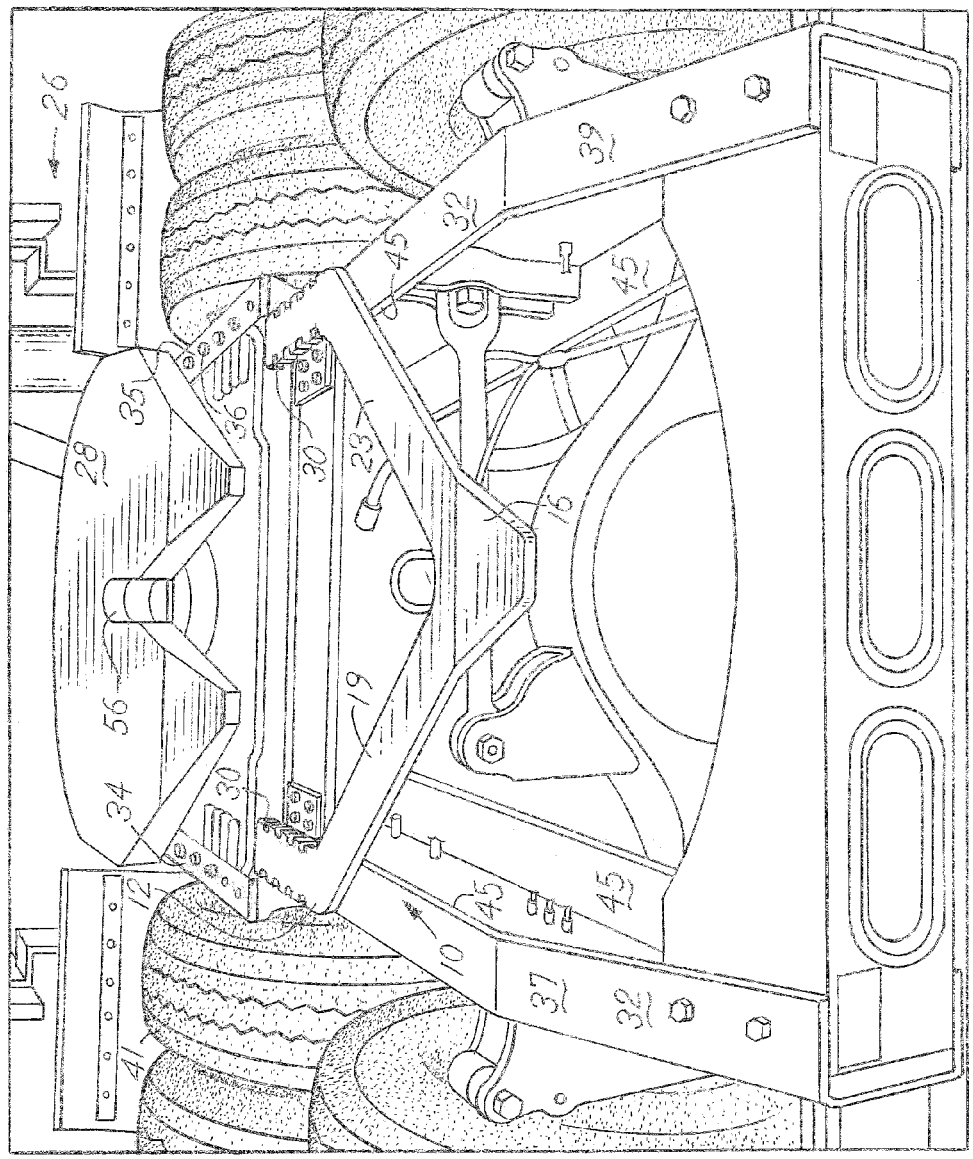
FIG. 1 is a rear perspective view of the safety device affixed to a tractor.

Referring to FIG. 1, the safety device 10 is defined by a first mounting arm 12, a second mounting arm 14, and a catch 16 spaced therebetween. Mounting arms 12, 14 are for mounting safety device 10 to a vehicle 26. Each mounting arm 12, 14 has a series of notches 30 that are cut into the sides opposite each other. The notches 30 can be seen in FIGS. 2 and 3. Each mounting arm 12, 14 is connected to the funneling portions 19, 23. Together, the mounting arms 12, 14, funneling portions 19, 23 and catch 16 are U-shaped. The mounting arms 12, 14, and catch 16, and funneling portions 19, 23 are formed as a unitary object. The left mounting arm 12 is connected to the left funneling portion 19. The right mounting arm 14 is connected to the right funneling portion 23.

As described herein, the vehicle 26 has a forward end in the direction of a front bumper of the vehicle, and a rearward end in the direction of a trailer 43 which is towed behind the vehicle. As such, any reference herein to forward or rearward is relative to the forward or rearward ends of vehicle 26. In the typical configuration, fifth wheel trailer hitch 28 is mounted above the rear axle(s) of vehicle 26. Hitch 28 is secured to the frame 32 of the vehicle, forward of the device 10. In the typical configuration a pair of parallel rails 34, 35 are secured to the frame 32 of vehicle 26, with the hitch 28 mounted on the rails. Rails 34, 35 each include a series of spaced apertures 36 along the length of the rails which allow hitch 28 to be mounted to rails 34, 35 which in turn are mounted to frame 32. The safety device is mounted to a vehicle 26 that is a truck, semi or similar vehicle which includes a fifth wheel trailer hitch 28. The hitch 28 is mounted forward of the safety device 10 as is shown in FIG. 1. The frame 32 of the vehicle 26 includes frame rails 37, 39 made of C-shaped beams. The frame rails 37, 39 have inwardly pointed flanges 45 on opposite sides. As depicted in FIG. 1, the left frame rail is 37 and the right frame rail is 39.

The notches 30 are adapted to receive U-bolts 17 that straddle the frame rails 37, 39. The U-bolts 17 mate with a retention bar 18, as shown in FIG. 7, which receive the clamping force of nuts 20 tightened onto U-bolts 17. The mounting arms 12, 14 are wider than the flanges 45 on the frame rails as is shown in FIG. 7. The notches 30 are cut into the sides of the mounting portions such that the distance between the deepest part of opposing notches are similar to the width of the frame rail as shown in FIG. 7. The flanges 45 could be bent if too much clamping force is produced from tightening the nuts 20 onto the U-bolts 17. Braces 21 are placed between the flanges 45 adjacent to the U-bolts 17. Each brace 21 has an upright piece 22 with ears 24 having holes 27 to accept a corresponding U-bolt 17. FIG. 7 shows the braces 21 in place. The ears 24 are placed on the upright piece 22 so that half of the thickness of each ear 24 extends beyond the upright piece 22. The ears 24 prevent the brace 21 from becoming loose, dislodged, or misaligned while the device 10 is being installed. The length of the upright piece 22 is the distance between the insides of the flanges 45. FIG. 7 shows the upright piece 22 supporting the flanges 45 from being deformed by the clamping force of the U-bolts 17. The ears 24 retain the brace 21 in close proximity to the U-bolt 17 such that compressive force from the U-bolt 17 is transferred through the upright piece 22 as shown in FIG. 1.

The mounting arms 12, 14 are mounted to rails 37, 39 at a rearward position from hitch 28. The mounting arms 12, 14 overlie the frame 32 of the vehicle 26.

The safety device 10 is formed having mounting arms 12, 14, that are parallel to each other and spaced at a proper distance to overlie the frame rails 37, 39. The distance between the frame rails 37, 39 is standard with little variation across vehicles 26 to which the safety device 10 will be mounted. The catch 16 is spaced rearwardly from the mounting arms 12, 14, and roughly equidistant between the mounting arms 12, 14. Catch 16 extends between funneling portions 19, 23 and has an inside edge 25, FIGS. 2 and 3, forming a "U" portion of the trough. Second mounting arm 14 is a mirror-image of first mounting arm 12. Both of the funneling portions 19, 23 are connected to their respective mounting arms 12, 14. When installed, the inside edge 25 is inside the frame rails 37, 39.

Safety Device 10 is formed having a top surface 88 and a bottom surface 90, which are separated by an edge 92 which circumscribes the entire safety device 10. Edge 92 includes an inner edge portion 94, FIG. 2 that extends from first mounting portion 12 to the second mounting portion 14. Safety device 10 includes a nose 48. Nose 48 is angled downwardly relative to the balance of the safety device with line 98 defining a crease about which safety device 10 is angled. The portion of top surface 88 on nose 48 defines a ramped surface 52 to safety device 10. Ramped surface 52 is preferably angled at an obtuse angle α, as seen in FIG. 4, relative to the balance of safety device 10.

One application of safety device 10 is for use with a fifth wheel hitch 28. Fifth wheel hitches generally are used to connect a trailer 43 to a vehicle 26. In the typical configuration, trailer 43 will have a down-turned kingpin 54, FIG. 1A extending from a forward portion of trailer 43. Generally, kingpin 54 extends downwardly from a hitch plate 110 which is a metal plate robustly mounted to the underside of the front portion of trailer 43, and is for providing support, structure, and stability to the kingpin and the trailer. Fifth wheel hitch 28 includes a kingpin slot 56 for accepting kingpin 54 and a locking jaw within kingpin slot 56 which is adapted for gripping and retaining kingpin 54 in kingpin slot 56. Locking jaw is articulable between a locked and an unlocked position. The locking jaw is well known in the art and may come in various forms such as a single jaw or a double jaw. All serving the same purpose of locking the kingpin 54 in a pivotal connection with the hitch 28.

Catch 16 faces the kingpin slot 56 such that if the jaw fails, and as a result kingpin 54 is ejected from fifth wheel hitch 28, the kingpin will move rearwardly toward safety device 10 and contact the inside surface 25 at catch 16. Due to the geometry of hitch 28, and the weight of trailer 43, the typical direction of ejection of kingpin 54 from hitch 28 is in the direction of safety device 10. Additionally, the most likely time for the jaw to fail is when the truck is accelerating forward, as the bulk of the weight of the load in trailer 43 will be pushing rearwardly against the jaw in response to the forward acceleration. During such forward acceleration, if the jaw fails, trailer 43 will begin to decelerate relative to vehicle 26, which will cause kingpin 54 to move rearwardly relative to hitch 28. Such rearward movement of kingpin 54 will move the kingpin into the safety device 10. As the kingpin 54 moves rearward, the funneling portions 19, 23 will funnel the kingpin 54 into the centrally located catch 16. Catch 16 will retain trailer 43 in contact with vehicle 26 so that trailer 43 does not come loose from the vehicle, and will provide the operator the opportunity to safely stop the vehicle and attend to repairing hitch 28. Due to the central location of the catch 16, the vehicle 26 will be temporarily able to tow the trailer 43 in a similar fashion as would be done with the kingpin 54 properly located in the hitch 28. Safety device 10 and catch 16 are a significant improvement over the prior art. The standard vehicle 26 which pulls a trailer 43 using a fifth wheel hitch 28 does not include any safety mechanism to retain the trailer in contact with the vehicle in the event the kingpin is loosed from the articulating jaw of the fifth-wheel hitch while the vehicle is in motion.

Ramped surface 52 functions to protect the leading surface of safety device 10 from blunt trauma from hitting kingpin 54 when trailer 43 is being coupled to fifth wheel hitch 28. By having a downwardly and rearwardly angled leading surface, kingpin 54 will be pushed up and over ramped surface 52 when trailer 43 is being coupled to vehicle 26. Ramped surface 52 protects both kingpin 54 and safety device 10 from damage during the coupling of trailer 26 to fifth wheel hitch 28.

Safety device 10 has a thickness 100 defined as the distance between the top side 88 and bottom side 90, as shown in FIG. 4. Kingpin 54 is well known in the art, and is typically formed as a rod axially extending from the underside of trailer 43, with the kingpin 54 having a narrowed section 102 defined by a wider lower section 104 and upper section 106, where narrowed section 102 has a smaller diameter than both lower section 104 and upper section 106. Narrowed section 102 has a height 108 defined as the distance between lower section 104 and upper section 106, as seen in FIG. 1A. In the preferred embodiment, thickness 100 of safety device 10 is less than height 108. This is so that when kingpin 54 contacts safety device 10 inner edge portion 94 it is bracketed by lower section 104 and upper section 106 such that trailer 43 is inhibited from upward or lower motion relative to safety device 10. This is particularly important at catch 16, which is thinner than height 108 even if funneling portions 19, 23 are formed of thicker material. In the case where hitch plate 110 rests on safety device 10, if an upward force lifts trailer 43, lower section 104 will catch on inner edge 94 as the trailer moves rearwardly, thereby trailer 43 is restricted from coming out of contact with safety device 10. In the preferred embodiment, thickness 100 of safety device 10 is less than thickness 108 of king pin 54. FIG. 5 shows the trailer 43 in its proper towing position being coupled to the fifth wheel hitch 28. FIG. 6 shows the safety device 10 working in the case where the kingpin 54 is dislodged from the hitch 28. The distance the catch 16 is positioned behind the hitch plate 110 allows room for the kingpin 54 to fall into the safety device 10. This means the kingpin 54 is caught in the catch 16 when the trailer 43 falls off of the hitch 28 as shown in FIG. 6.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A safety device for use on a towing vehicle adapted for towing a trailer, said vehicle having left and right opposing C-shaped frame rails, said C-shaped rails being defined by an upper flange, a lower flange, and a connecting member, said opposing rails having inwardly facing flanges, said frame rails having a forward portion and a rearward portion, a hitch affixed to said forward portion of said frame rails and adapted for receiving a kingpin of said trailer, said kingpin having a narrowed section defined by a wider lower section and wider upper section said narrowed section having a smaller diameter than both said upper section and said lower section of said kingpin, said narrowed section having a height, said safety device comprising:
- a left and right mounting portion, said mounting portions adapted for being affixed to corresponding left and right upper flanges of said frame rails;
- a left elongate funneling portion affixed to said left mounting portion at an obtuse angle;
- a right elongate funneling portion affixed to said right mounting portion at an obtuse angle; and
- a catch, having a ramped portion and a funneling attachment portion, said funneling attachment portion connecting said left and right elongate funneling portions to form a U-shape.

2. The safety device of claim 1, said mounting portions having notches adapted to receive U-bolts that are positionable to straddle said C-shaped frame rails and provide a clamping force to hold said safety device to said upper flanges of said frame rails.

3. The safety device of claim 2, including a brace adapted for extending between said upper flange and said lower flange, located substantially opposite said connecting member and adapted to receive said U-bolts.

4. The safety device of claim 3, wherein a thickness of said catch is less than a height of a notch in said kingpin.

5. A safety device for use on a towing vehicle that tows a trailer, said safety device comprising:
- a first mounting arm having an inner edge and an outer edge, said edges having notches adapted for receiving U-bolts;
- a second mounting arm having an inner edge and an outer edge, said edges having notches adapted for receiving U-bolts;
- a first funneling portion connected to said first mounting arm; and
- a second funneling portion connected to said second mounting arm, said funneling portions being connected to form a continuous generally U-shaped device.

6. The safety device as claimed in claim 5, wherein said funneling portions join to form a catch portion that has an arcuate surface facing said mounting arms, said catch portion being substantially equidistantly located between said mounting arms.

7. The safety device as claimed in claim 6, wherein said first mounting arm, second mounting arm, said first funneling portion and said second funneling portion form a substantially planar structure, said safety device further comprising a nose portion being angled obliquely with respect to the rest of said safety device and extending out of plane with the rest of said safety device, said nose portion being located adjacent to said catch portion.

8. A safety device for use in combination with a towing vehicle and a trailer, said vehicle having a fifth wheel hitch mounted to a pair of substantially parallel frame rails on said vehicle, said fifth wheel hitch having a kingpin slot for receiving a king pin and a locking jaw within said kingpin slot for retaining a kingpin of a trailer, said kingpin of said trailer having a narrowed section defined by a wider lower section and wider upper section said narrowed section having a smaller diameter than both said upper section and said lower section of said kingpin, said narrowed section having a height, said safety device comprising:
- a first mounting arm adapted for being fastened to one of said frame rails;
- a second mounting arm adapted for being fastened to another of said frame rails;
- a first funneling portion connected to said first mounting arm; and
- a second funneling portion connected to said second mounting arm, said first and second funneling portions being connected to form a catch located where said first and second funneling portions meet;
- said mounting arms including notches for receiving U-bolts that are adapted for straddling said frame member and providing a clamping force to hold said mounting arms to said frame rails.

9. The safety device of claim 8, wherein said first mounting arm is connected to said first funneling portion, said first mounting arm including an inner edge located inwardly of said first mounting arm and being adapted to be inwardly located of a corresponding frame rail when said safety device is mounted to said frame rails, said second mounting arm is connected to said second funneling portion, said second mounting arm including an inner edge located inwardly of said second mounting arm and being adapted to be inwardly located of a corresponding frame rail when said safety device is mounted to said frame rails, said funneling portions forming obtuse angles with respect to said inner edges of said offsetting portions.

10. The safety device of claim 9, said frame rail being C-shaped, comprising an upper flange, a lower flange, and a connecting member between said flanges, said safety device including a brace adapted for extending between said upper and lower flange of said frame rail, located substantially opposite said connecting member and adapted to receive said U-bolts.

11. The safety device of claim 10, wherein said device includes a nose portion adjacent to said catch and bent obliquely with respect to said safety device.

* * * * *